United States Patent
Sato

(10) Patent No.: US 8,608,895 B2
(45) Date of Patent: Dec. 17, 2013

(54) EASY-OPEN CONTAINER, MANUFACTURING METHOD THEREOF AND MANUFACTURING DEVICE THEREOF

(75) Inventor: Toshiya Sato, Sodegaura (JP)

(73) Assignee: Idemitsu Unitech Co. Ltd., Tokyo (JP)

( * ) Notice: Subject to any disclaimer, the term of this patent is extended or adjusted under 35 U.S.C. 154(b) by 2175 days.

(21) Appl. No.: 11/341,433

(22) Filed: Jan. 30, 2006

(65) Prior Publication Data

US 2006/0182912 A1    Aug. 17, 2006

(30) Foreign Application Priority Data

Jan. 31, 2005    (JP) .................. 2005-022444

(51) Int. Cl.
*B32B 37/00*    (2006.01)

(52) U.S. Cl.
USPC ........................................... 156/292

(58) Field of Classification Search
USPC .............. 428/35.7; 156/292, 308.4, 379.8, 69
See application file for complete search history.

(56) References Cited

U.S. PATENT DOCUMENTS

| | | | | |
|---|---|---|---|---|
| 3,679,509 A | * | 7/1972 | Fielibert | 156/182 |
| 4,858,780 A | * | 8/1989 | Odaka et al. | 220/269 |
| 4,870,800 A | * | 10/1989 | Kasai | 53/88 |
| 4,961,513 A | * | 10/1990 | Gossedge et al. | 220/276 |
| 5,034,074 A | * | 7/1991 | Thomas, Jr. | 156/69 |
| 5,160,391 A | * | 11/1992 | Thomas, Jr. | 156/69 |
| 2007/0164094 A1 | * | 7/2007 | Takahashi | 229/123.1 |

FOREIGN PATENT DOCUMENTS

| | | |
|---|---|---|
| CN | 1053775 A | 8/1991 |
| JP | 57-107812 | 7/1982 |
| JP | 62-28355 | 2/1987 |
| JP | 63-78 | 1/1988 |
| JP | 1-213171 | 8/1989 |
| JP | 1-176002 | 12/1989 |
| JP | 2-67125 | 3/1990 |
| JP | 2-233378 | 9/1990 |
| JP | 2-233380 | 9/1990 |
| JP | 9-99933 | 4/1997 |
| JP | 2001-10658 | 1/2001 |
| JP | 2005-271972 | 10/2005 |
| WO | WO 2004/089779 A1 | 10/2004 |

OTHER PUBLICATIONS

Office Action issued Aug. 9, 2011 in Japanese Patent Application No. 2009-032784 (with English translation).

* cited by examiner

*Primary Examiner* — Steven A. Reynolds
*Assistant Examiner* — King M Chu
(74) *Attorney, Agent, or Firm* — Oblon, Spivak, McClelland, Maier & Neustadt, L.L.P.

(57) ABSTRACT

In manufacturing an easy-open container (1), a flange (25) of a container body (2) and a lid (3) are heat-sealed, where a circular sealing board (7) having a curved surface on an inner circumferential edge and an inclined surface on an outer circumferential edge side is pressed onto an upper side of the flange (25) to form a swelling gathered resin part (6) formed of respective resin components of a surface layer (21) of the container body (2), a subsurface layer (22) adjacent to the surface layer (21) and a seal layer (31) of the lid (3), while heat-sealing the surface layer (21) of the container body (2) and the seal layer (31) of the lid (3). With the arrangement, the easy-open container (1) having both a high sealing performance and an easy-open performance can be provided with low cost.

2 Claims, 7 Drawing Sheets

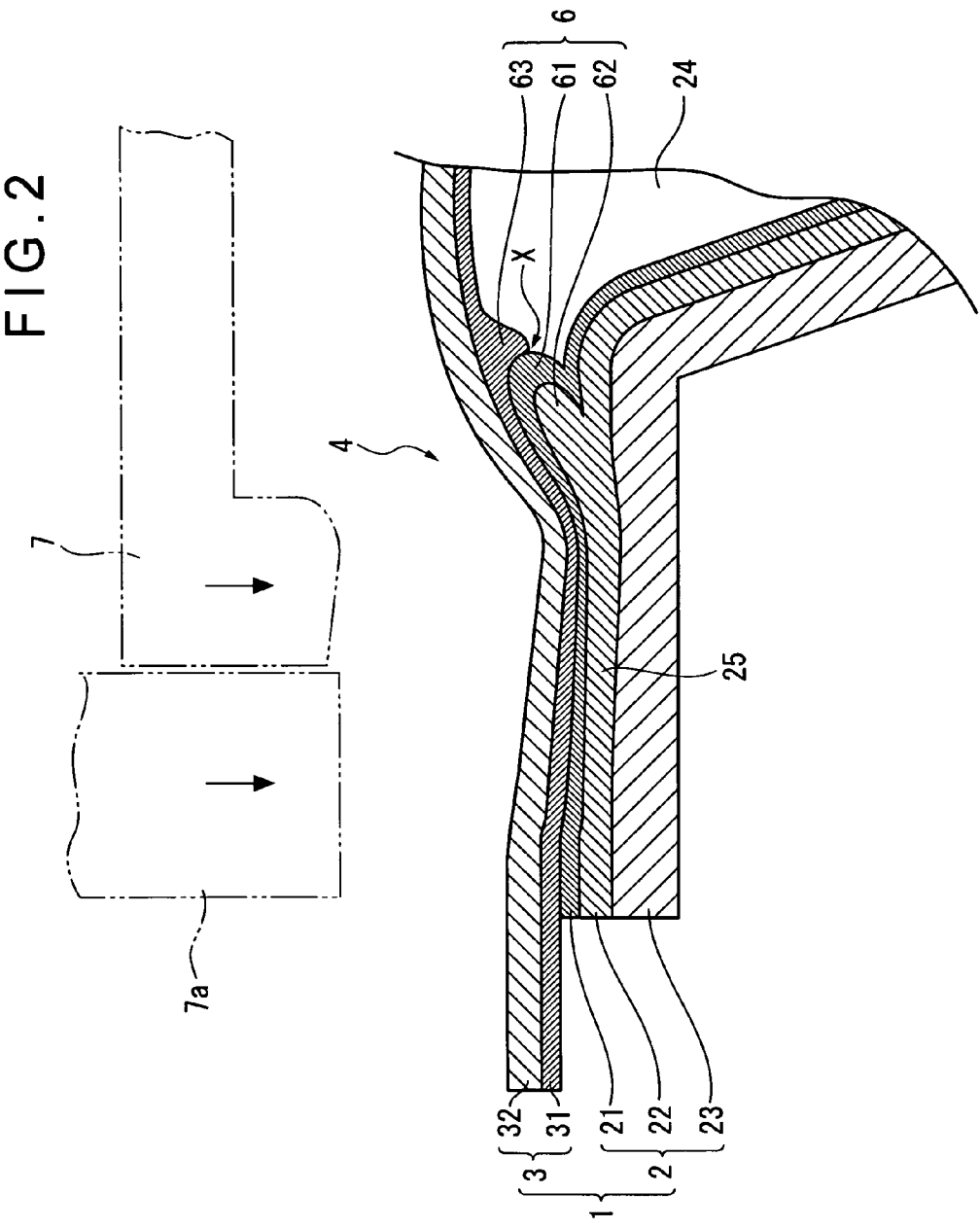

EASY-OPEN CONTAINER, MANUFACTURING METHOD THEREOF AND MANUFACTURING DEVICE THEREOF

BACKGROUND OF THE INVENTION

1. Field of the Invention

The present invention relates to an easy-open container, a manufacturing method thereof and a manufacturing device thereof.

2. Description of Related Art

For packaging foods and the like, there have been widely used a lidded container including a container body with a flange extending from a circumference of an opening of the container body and a filmy lid, the container being hermetically sealed, after filling the container with the foods and the like, by heat-sealing the flange of the container body and the lid.

Such lidded container requires a high sealing performance in terms of securely preserving the foods and the like contained therein, where the flange provided to the container body and the lid are heat-sealed so that a seal part formed by the heat-sealing becomes difficult to be peeled off, while the container requires an easy-open performance in terms of usability in opening the lid so that the lid can be easily peeled off from the container body. Accordingly, the lidded container requires to have the sealing performance and the easy-open performance as contradictory characteristics at the same time.

However, since leakage of contents is a fatal problem for the lidded container (easy-open container) having the characteristics described above, a sealing condition (sealing temperature and sealing pressure) is set to high at the expense of the easy-open performance to some extent so that the seal part becomes difficult to be peeled off to prevent the contents from leaking out from the container, which has resulted in losing the easy-open performance of the container.

With such background, arts for obtaining an easy-open container having both the high sealing performance and the easy-open performance have been studied from various quarters. For instance, there has been proposed an art in which a container that is opened by peeling a seal layer of a container body from a layer adjacent to the seal layer, and a notch is provided on a flange of the container body so that the seal layer can be properly cut off from the container body by peeling the seal layer along the notch (see, for instance, Reference 1: JP-A-63-78). There has been proposed another art in which a container and a lid are heat-sealed with a projected sealing board to form gathered resin parts respectively on both boundaries between a seal part and non-seal parts (see, for instance, Reference 2: JP-A-2-67125). There has been proposed still another art in which an opening surface is provided between a seal layer and a layer below the seal layer of a container and a gathered resin part is formed only on an inner boundary between a seal part and a non-seal part (see, for instance, Reference 3: JP-A-2-233378).

However, in the art disclosed in Reference 1, notch forming on the flange of the container body and positional adjustment in sealing are difficult, resulting in poor workability and high production cost.

In the art disclosed in Reference 2, when the gathered resin parts are formed on both boundaries, even in a case where one of the gathered resin parts is crushed by heat-sealing in another step, a part of the gathered resin part formed on an outer circumferential part of a bar is stretched when the lid is opened, resulting in poor opening appearance. In addition, even when the opening surface is provided between a seal layer and an adjacent layer adjacent to the seal layer of the container, the seal layer is not stably cut off, resulting in poor opening appearance.

In the art disclosed in Reference 3, a sufficient easy-opening performance cannot be realized in actual use, where the seal layer of the container at an open trigger of the container is not cut off or not peeled off from the layer below the seal layer, and further, when a stress is applied to open the container, a surface layer is stretched, which causes poor opening appearance. In addition, the easy-open container having the above arrangement causes difficulty in starting opening.

SUMMARY OF THE INVENTION

An object of the present invention is to provide an easy-open container that can be produced with low cost and has both of a high sealing performance and an easy-open performance, as well as a manufacturing method and a manufacturing device of the container.

An easy-open container according to an aspect of the present invention includes: a container body having an opening and a flange extending from a circumference of the opening; and a lid for covering the opening, a surface layer of the container body exposed on the flange and a seal layer of the lid being circularly heat-sealed to form the easy-open container. The lid can be opened by a cohesive failure occurring in the surface layer of the container body and/or the seal layer of the lid. A swelling gathered resin part formed of respective resin components of the surface layer of the container body, a layer adjacent to the surface layer and the seal layer of the lid is formed in a vicinity of an inner circumferential end of a seal part located on the flange.

According to the aspect of the present invention, since the easy-open container can be obtained by circularly heat-sealing the flange of the container body and the lid, the container can maintain the high sealing performance. Also, since the lid can be opened by the cohesive failure occurring in the surface layer of the container body and/or in the seal layer of the lid, the container shows stable initial opening strengths and can be opened smoothly as compared to a mode in which a surface layer of a container body and a layer adjacent to the surface layer are peeled off from each other by an interfacial peel.

Since the swelling gathered resin part is formed in the vicinity of the inner end of the seal part on the flange, the gathered resin part being formed of resin components of the surface layer of the container body, the layer adjacent to the surface layer and the seal layer of the lid, when a cohesive peel caused by the cohesive failure reaches a point where the gathered resin part exists, a stress for peeling acts in a direction in which the lid is peeled off from the container body due to the existence of the gathered resin part, which allows the lid to be properly cut off from the flange of the container body, so that the easy-open container with a good opening performance can be obtained.

Due to formation of the gathered resin part, since a stress for opening the lid (internal pressure) acts in a direction toward a base of the gathered resin part, the internal pressure acts in a direction different from a plane on which the cohesive failure likely occurs in the gathered resin part. Accordingly, the container can maintain a performance that is resistant against being opened by the internal pressure (hereinafter, referred to as "high sealing performance" in some cases).

Herein, the cohesive failure occurring in the surface layer of the container body and/or in the seal layer of the lid includes not only a mode in which the cohesive failure occurs in the surface layer or the seal layer of the lid to cause the container to be opened but also a mode in which the cohesive failure occurs both in the surface layer of the container body and the seal layer of the lid to cause the container to be opened.

According to another aspect of the present invention, a manufacturing method of an easy-open container including: a container body having an opening and a flange extending from a circumference of the opening; and a lid for covering the opening, in which a surface layer of the container body exposed on the flange and a seal layer of the lid are heat-sealed to form the easy-open container and the lid can be opened by a cohesive failure occurring in the surface layer of the container body and/or the seal layer of the lid, includes: superposing the lid on an upper side of the flange of the container body; pressing a circular sealing board onto the upper side of the flange from above the lid, the sealing board having, at least at a part thereof, a shape in which an inner circumferential edge is rounded to form a curved surface with a curved cross section and an outer circumferential edge of the sealing board is so formed as to touch the lid later than a tip thereof, and heat-sealing the surface layer exposed on the flange of the container body and the seal layer of the lid while forming a swelling gathered resin part formed of respective resin components of the surface layer of the container body, a layer adjacent to the surface layer and the seal layer of the lid, the gathered resin part being formed in a vicinity of a position on the flange which the inner edge of the circular sealing board touches.

According to the aspect of the present invention, since the manufacturing method of the easy-open container allows the gathered resin part to be selectively provided to the flange in the vicinity of the position which the inner edge of the circular sealing board touches, the container to be obtained can maintain the high-sealing performance, while the lid can be opened easily from the flange of the container body (hereinafter, referred to as "easy-open performance" in some cases) by selecting a material that generates the cohesive failure by a force in opening the lid for the surface layer of the container body and/or the seal layer of the lid.

In addition, the selection of the material that generates the cohesive failure by the force in opening the lid for the material of the surface layer of the container body and/or the seal layer of the lid can prevent the lid, the surface layer of the container and the like from being broken or prevent the surface layer from being stretched due to the stress in opening the lid, so that opening appearance of the container can be prevented from being degraded.

Further, positioning of the circular sealing board in manufacturing the container does not have to be very accurate, thus achieving good productivity and providing the easy-open container with high quality and with low cost.

Incidentally, as for the shape of the circular sealing board which is so arranged that the outer edge touches the lid later than the tip, there can be exemplified an arrangement in which an inclined surface with an inclined cross section is provided on the outer edge side of the circular sealing board.

According to still another aspect of the present invention, a manufacturing method of an easy-open container including: a container body having an opening and a flange extending from a circumference of the opening; and a lid for covering the opening, in which a surface layer of the container body exposed on the flange and a seal layer of the lid are heat-sealed to form the easy-open container and the lid can be opened by a cohesive failure occurring in the surface layer of the container body and/or the seal layer of the lid, includes: superposing the lid on an upper side of the flange of the container body; pressing a first circular sealing board onto the upper side of the flange from above the lid, the sealing board having, at least at a part thereof, a shape in which an inner circumferential edge is rounded to form a curved surface with a curved cross section and an outer circumferential edge of the sealing board is so formed as to touch the lid later than a tip thereof; heat-sealing the surface layer exposed on the flange of the container body and the seal layer of the lid while forming a swelling gathered resin part formed of respective resin components of the surface layer of the container body, a layer adjacent to the surface layer and the seal layer of the lid, the gathered resin part being formed in a vicinity of a position on the flange which the inner edge of the circular sealing board touches; and pressing a second circular sealing board onto an outer circumferential side of the gathered resin part so as not to allow the second circular sealing board to touch the gathered resin part to heat-seal the surface layer of the container body and the seal layer of the lid.

According to the aspect of the present invention, by heat-sealing with the second circular sealing board after the heat-sealing with the first circular sealing board, the surface layer exposed on the flange of the container body and the seal layer of the lid are completely fused to each other, thus preventing contaminants from entering, as well as enjoying the above described advantage. Note that the heat-sealing with the second circular sealing board in this case is not for securing the sealing performance, and thus this heat-sealing is typically weak. The weak sealing normally indicates that the entire peel strength between the lid and the flange is 3 kgf or smaller, preferably 2.5 kgf or smaller.

According to further aspect of the present invention, a manufacturing device of an easy-open container that includes: a container body having an opening and a flange extending from a circumference of the opening; and a lid for covering the opening includes a circular sealing board for heat-sealing a surface layer of the container body exposed on the flange and a seal layer of the lid. The circular sealing board is pressed onto the upper side of the flange, the sealing board having, at least at a part thereof, a shape in which an inner circumferential edge is rounded to form a curved surface with a curved cross section, while being so arranged that an outer circumferential edge of the circular sealing board touches the lid later than a tip thereof.

According to the aspect of the present invention, the manufacturing device of the easy-open container can allow the gathered resin part to be provided selectively in the vicinity of the inner end of the seal part on the flange, so that the container with the high sealing performance can be manufactured. Although the circular sealing board may be provided, to the entire circumference thereof, with an arrangement in which the inner edge is rounded to have the curved surface with a curved cross section and the outer edge touches the lid later than the tip of the circular sealing board, such arrangement may alternatively be provided to the seal surface of the circular sealing board only at a position corresponding to the open trigger of the container. In this case, the seal surface of the circular sealing board at a position corresponding to a part other than the open trigger may be flat and both of the inner and outer edges are rounded similarly to form curved surfaces with curved cross sections. With the arrangement described above, since gathered resin parts with similar sizes are provided to the part other than the open trigger, the container can have further higher sealing performance, while having the easy-open performance at the open trigger of the container, which causes the opening performance at the part other than the open trigger to be lowered, so that the easy-open performance of the container as a whole is secured.

BRIEF DESCRIPTION OF THE DRAWINGS

FIG. 2 is a fragmentary cross section of the open trigger of the easy-open container according to the first embodiment;

DETAILED DESCRIPTION OF PREFERRED EMBODIMENT(S)

Embodiments of the present invention will be described below with reference to the attached drawings.

[First Embodiment]
(I) Arrangement of Easy-Open Container 1

Figure 1A:
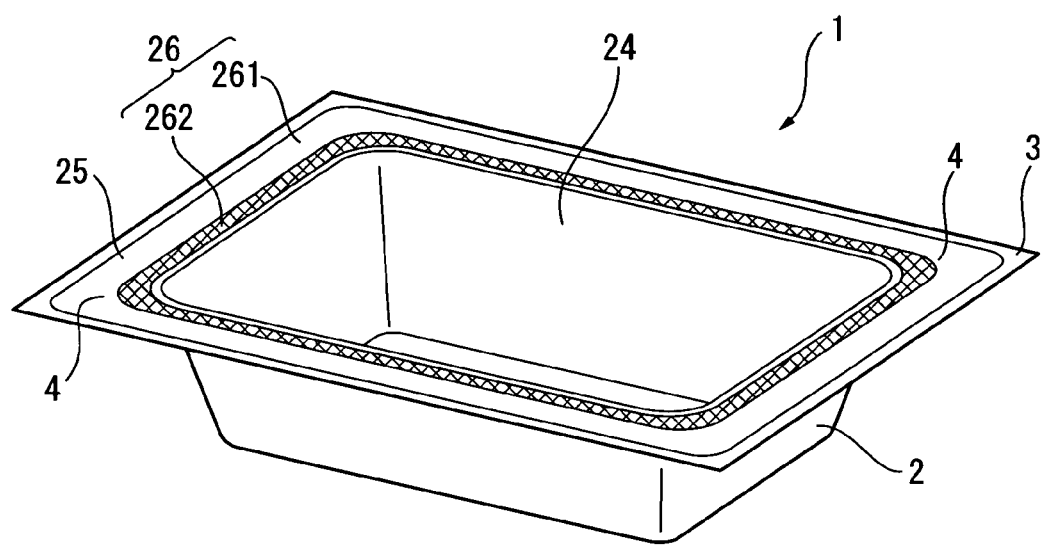
FIG. 1A is an illustration briefly showing an easy-open container that is sealed with a lid according to a first embodiment of the present invention.
Figure 1B:
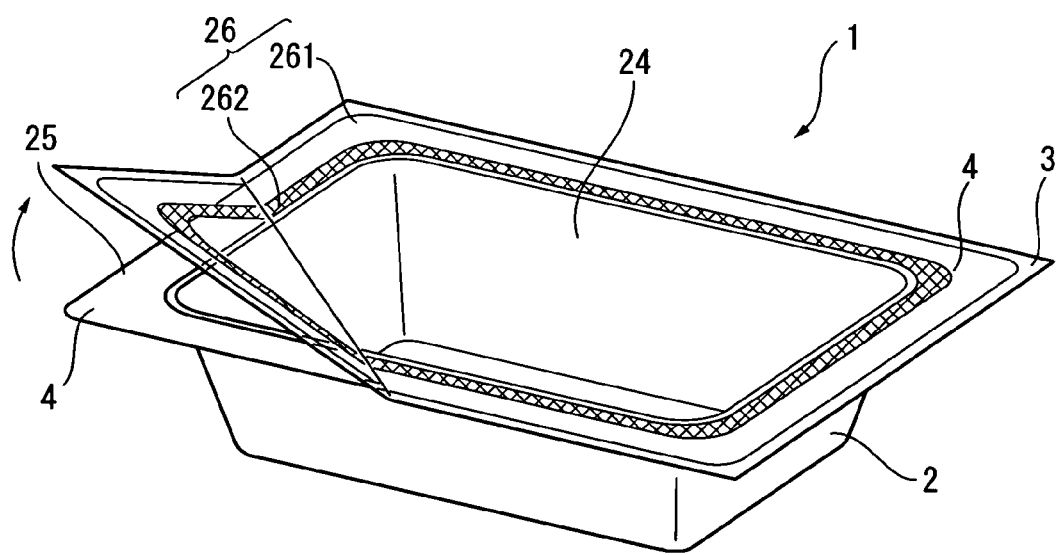
FIG. 1B is an illustration briefly showing the easy-open container with the lid being opened form an open trigger.

FIGS. 1A and 1B are illustrations briefly showing one mode (first embodiment) of the easy-open container 1 of the present invention, where FIG. 1A shows the container 1 that is sealed by a lid 3, and FIG. 1B shows the container 1 with the lid 3 being opened from an open trigger 4. FIG. 2 is a cross section of the open trigger 4 of FIGS. 1A and 1B.

The inside of the easy-open container 1 is rendered a hermetically-sealed condition as shown in FIG. 1A by superposing the lid 3 on a container body 2 to cover an opening 24 and heat-sealing the lid 3 to a flange 25 extending from a circumference of the opening 24 of the container body 2 to form a circular seal part 26 (the seal part 26 including a seal part 262 formed by a circular sealing board 7 and a seal part 261 formed by a circular sealing board 7a as shown in FIG. 2).

In order to open the easy-open container 1 in hermetically-sealed condition, the lid 3 is pulled upward (in a direction shown by an arrow in FIG. 1B) at the open trigger 4 that is provided to a corner of the easy-open container 1 as shown in FIG. 1B (and also shown in FIGS. 6 and 7 described later), so that the easy-open container 1 can be opened easily.

(I-1) Arrangement of Container Body 2

The easy-open container 1 shown in FIGS. 1A, 1B and 2 includes the container body 2 which is a laminated body having three layers of a surface layer 21, a subsurface layer 22 and a base material layer 23.

The container body 2 is shaped like a tray having a substantially rectangular shape with a predetermined depth, the container body 2 having the substantially rectangular opening 24 and the flange 25 extending outwardly from the circumference of the opening 24.

Figure 6:
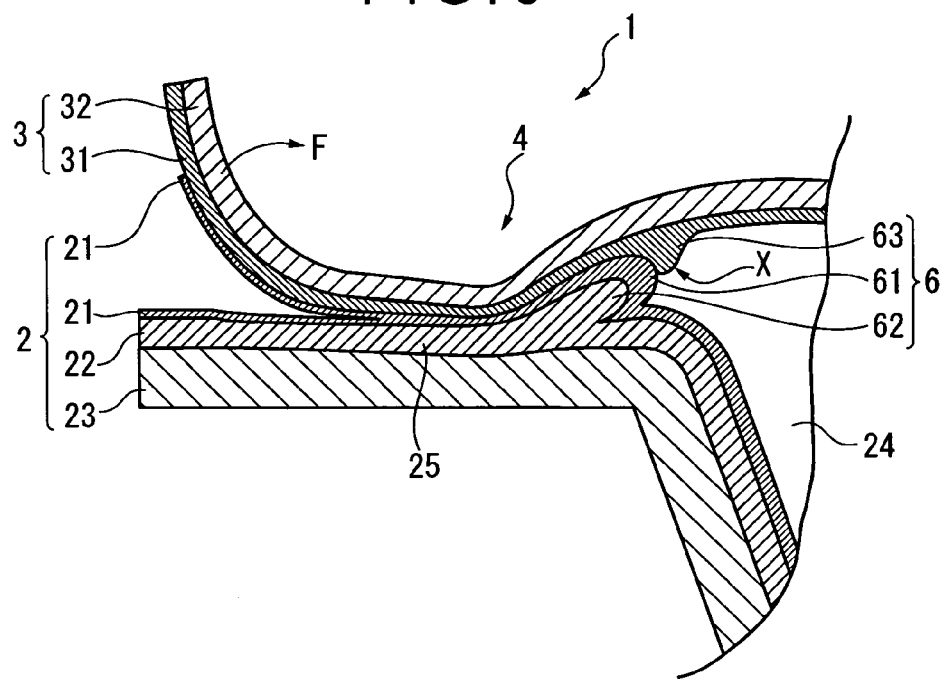
FIG. 6 is a fragmentary cross section showing an initial open state of the easy-open container according to the first embodiment.

In the present embodiment, the easy-open container 1 is opened by a cohesive peel which is caused by a cohesive failure occurring in the surface layer 21 of the container body 2 as shown in FIG. 6 described later.

Examples of a resin for forming the surface layer 21 include a resin composition obtained by blending at least one of an ethylene-acrylic ester-maleic acid anhydride copolymer and a styrene graft propylene resin with a polypropylene resin. Herein, the ethylene-acrylic ester-maleic acid anhydride copolymer or the styrene graft propylene resin may be preferably contained by 10 to 50 wt %, more preferably, 15 to 40 wt % relative to the polypropylene resin being 100 wt %.

The subsurface layer 22 of the container body 2 is a layer arranged adjacent to and below the surface layer 21, and the subsurface layer 22 may be formed of, for instance, an olefin resin such as the polypropylene resin and a polyethylene resin, a polystyrene resin, a polyester resin such as a polyethylene terephthalate (PET) and blended materials of the above.

The base material layer 23 of the container body 2 is a layer constituting the outer side of the container body 2, materials of which include, for instance, the olefin resin such as the polypropylene resin and the polyethylene resin, the polystyrene resin, the polyester resin such as the polyethylene terephthalate (PET), a single layer body or a laminated body of the blended material of the above and, in terms of providing a gas barrier property, resin materials such as ethylene-vinylalcohol copolymer, nylon, the polyethylene terephthalate (PET) and polyvinylidene chloride (PVDC), and a resin material with a gas barrier layer formed by aluminum evaporation.

(I-2) Arrangement of Lid 3:

In the present embodiment, the lid 3 is a laminated body including an outer layer 32 exposed outside of the easy-open container 1 and a seal layer 31 heat-sealed to the surface layer 21 of the container body 2.

The seal layer 31 of the lid 3, which is heat-sealed to the surface layer 21 of the container body 2, has a mode of opening in which the seal layer 31 is peeled off by the cohesive failure occurring in the surface layer 21 of the container body 2 to cause the surface layer 21 to be peeled off. When the above-described resin composition is employed as a resin for forming the surface layer 21, a random polypropylene (RPP), a block polypropylene (BPP), a linear low-density polyethylene (LLDPE), a polyethylene, etc can be used.

The outer layer 32 of the lid 3 can be formed of a polyethylene terephthalate (PET) film, a biaxially-oriented nylon film (O-Ny), etc.

Note that in a case where the container body 2 employs the surface layer 21 and the lid 3 employs the seal layer 31 as layers to be heat-sealed to each other, the both layers 21, 31 are fused to each other, while, in opening, the cohesive peel occurs in the surface layer 21 of the container body 2 that is weak against the stress, so that the opening can be performed properly.

(I-3) Formation of Gathered Resin Part 6:

As shown in FIG. 2, the easy-open container 1 of the present embodiment is provided with a swelling gathered resin part 6 in the vicinity (indicated by X in FIG. 2) of an inner circumferential end of the seal part on the flange 25, the gathered resin part 6 being formed by pushing the subsurface layer 22 and the surface layer 21 of the container body and the seal layer 31 of the lid 3 in a direction toward the opening 24 of the container body 2.

As shown in FIG. 2, the gathered resin part 6 is formed by a gathered resin 61 of the surface layer 21 of the container body 2, a gathered resin 62 of the subsurface layer 22 and a gathered resin 63 of the seal layer 31 of the lid 3. With such gathered resin part 6 provided to the easy-open container 1 having the opening arrangement in which the cohesive peel occurs in the surface layer 21 of the container body 2, the easy-open container 1 can be provided with a high sealing performance that is required as the packaging container, while properly maintaining an easy-open performance due to the opening arrangement using the cohesive failure. In addition, the gathered resin part 6 allows the lid 3 to be easily cut off from the flange 25 of the container body 2. Further, the gathered resin part 6 causes a direction in which the stress due to the internal pressure acts and a direction in which the opening easily occurs due to the cohesive failure to become different, thereby allowing the sealing performance to be enhanced.

In the present invention, the easy-open container 1 has the above-described gathered resin part 6 in the vicinity (indicated by X in FIG. 2) of the entire inner end of the circular seal part on the upper side of the flange 25 of the container, has no or only a smaller gathered resin (than the gathered resin part 6 in the vicinity X of the inner end) on an outer circumferential end of the circular seal part 26 at the open trigger of the container, and has a gathered resin part (not shown) having substantially the same size (as the gathered resin part 6 in the vicinity X of the inner end) on the entire outer end of the circular seal part 26 other than the open trigger 4 of the container body 2. The arrangement provides the container 1 with the high sealing performance, the easy-open performance, and an anti-open performance of the lid 3 from a part other than the open trigger 4, which are preferable performances.

In order to fuse the flange 25 of the container body 2 and the lid 3 to create hermetically-sealed condition of the easy-open container 1 in manufacturing the easy-open container 1, the lid 3 is superposed on the flange 25 of the container body 2 to heat-seal them by pressing the heated circular sealing board onto the upper side of the lid 3. In order to form the swelling gathered resin part 6 in the vicinity X of the inner end of the seal part at the open trigger 4, for instance, the following method can be employed.

Figure 3:
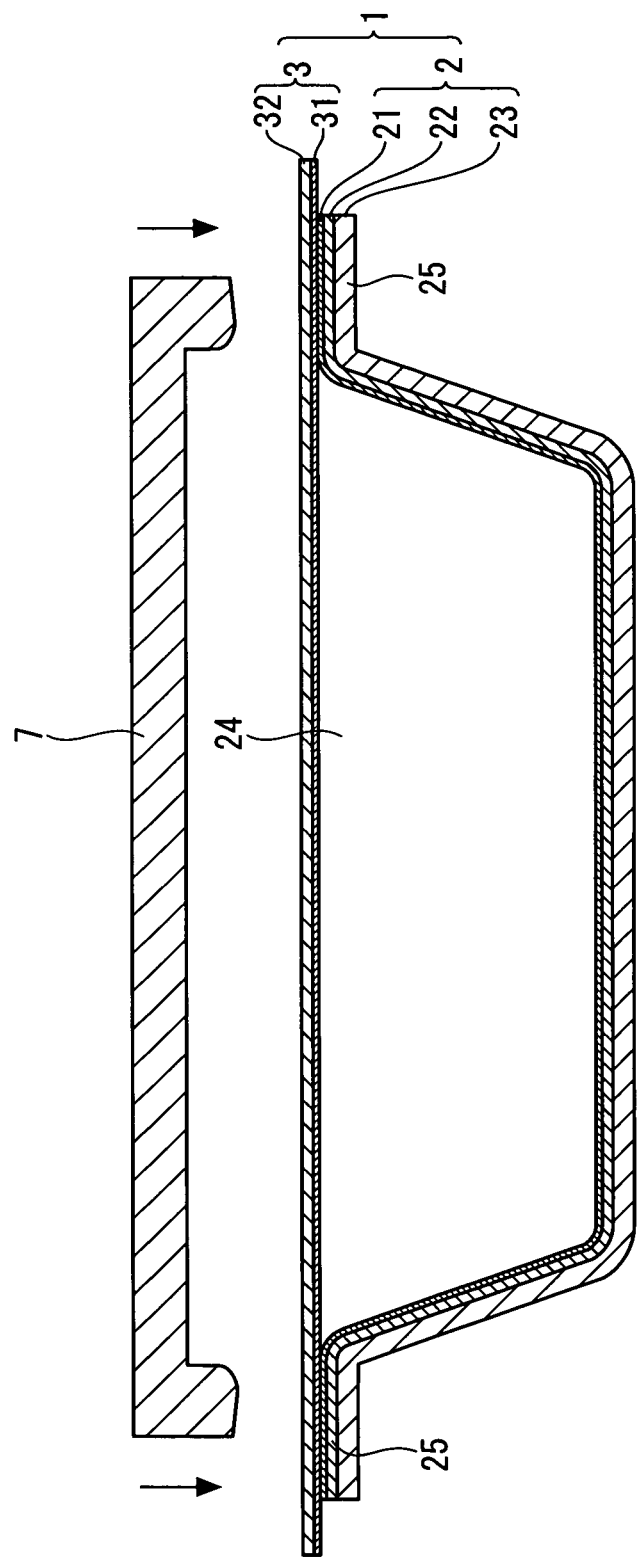
FIG. 3 is a schematic diagram of a sealing step of the easy-open container according to the first embodiment.

FIG. 3 is a schematic diagram of a sealing step of the open trigger 4 in manufacturing the easy-open container 1 according to the embodiment.

The heat-sealing of the flange 25 of the container body 2 and the lid 3 is performed, as shown in FIG. 3, by superposing the lid 3 on the flange 25 of the container body 2 and pressing the heated circular sealing board 7 from above the lid 3 in a direction shown by arrows in FIG. 3, so that the surface layer 21 exposed on the flange 25 of the container body 2 and the seal layer 31 of the lid 3 are fused to each other.

Figure 4:
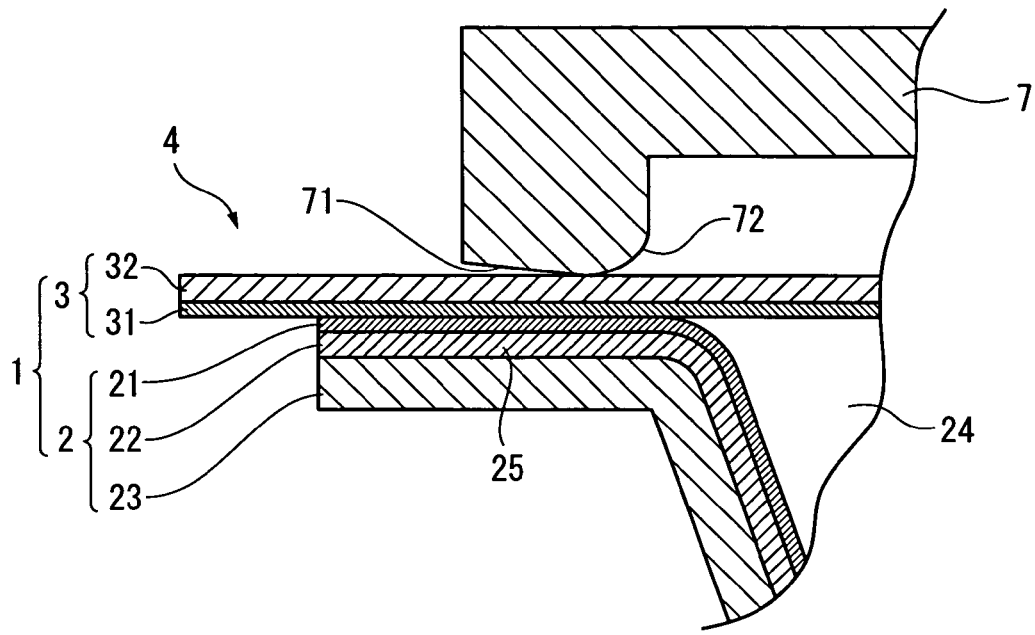
FIG. 4 is a fragmentary cross section showing how a flange is heat-sealed by a circular sealing board according to the first embodiment.
Figure 5:
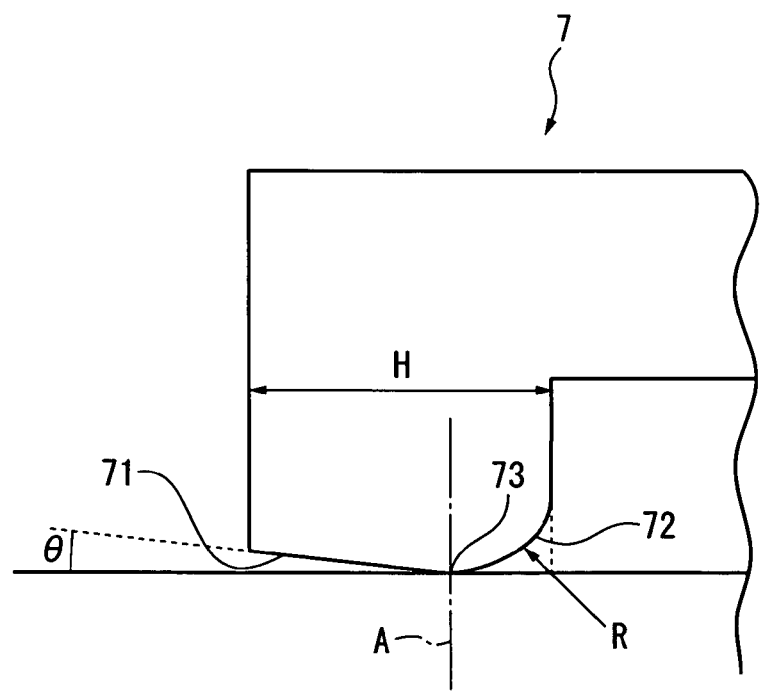
FIG. 5 is a fragmentary enlarged view section of the circular sealing board of the first embodiment.

FIG. 4 is a fragmentary cross section showing how the flange 25 is heat-sealed by the circular sealing board 7, and FIG. 5 is a fragmentary enlarged cross section of the circular sealing board 7.

The circular sealing board 7 used for manufacturing the easy-open container 1 of the present embodiment is so formed that an inner circumferential edge thereof is rounded and an outer circumferential edge thereof touches the lid 3 later than a tip (tip 73 in FIG. 5) of the circular sealing board 7. Specifically, there are continuously provided an inclined surface 71 with an inclined cross section on the outer edge side and a curved surface 72 which is rounded to have a curved cross section on the inner edge side with a boundary A (i.e., the tip 73 of the circular sealing board 7) intervened therebetween.

An angle ($\theta$) of the inclined surface 71 formed on the outer edge side of the circular sealing board 7, the angle ($\theta$) extending from the inner edge side toward the outer edge side relative to the flange 25 as shown in FIG. 5, is preferably set to 2° to 20°, more preferably 3° to 15°, though it depends on a width H of the circular sealing board 7.

If the angle of the inclined surface 71 is less than 2°, even when the sealing board 7 is pressed onto the lid 3 in heat-sealing, the above-described gathered resin part 6 as shown in FIG. 2 becomes easier to be formed also in the vicinity of the outer end of the seal part 26, which increases a resisting force on the outer side of the seal part 26 when the obtained container 1 is opened, so that smooth opening of the easy-open container 1 becomes difficult. On the other hand, if the angle of the inclined surface 71 exceeds 20°, a part around the boundary A becomes unsmooth and peaked, which might cut the lid 3 in sealing or in opening, resulting in degradation of the easy-open performance.

When the inner edge of the circular sealing board 7 is rounded to form the curved surface 72, radius thereof is preferably set to 0.2 mm to 0.5 HmmR, more preferably, 0.3 mm to 0.4 HmmR, though it depends on the width H of the circular sealing board 7. If the radius is smaller than 0.2 mmR, the part around the boundary A becomes unsmooth and peaked, which might cut the lid 3 in sealing or in opening. On the other hand, if the radius exceeds 0.5 HmmR, the cross section of the circular sealing board 7 becomes peaked, which might cut the lid 3 in sealing or in opening.

Herein, the inclined surface 71 and the curved surface 72 of the circular sealing board 7 are so formed that the boundary A is positioned on the inner side (inner edge side) in a sectional width direction of the circular sealing board 7. With the boundary A being formed on the inner side in the sectional width direction of the circular sealing board 7, and further, with the curved surface 72 formed on the inner edge side and the inclined surface 71 formed on the outer edge side of the circular sealing board 7, it is secured that the tip 73 touches the lid 3 earlier than the outer edge side of the circular sealing board 7 in heat-sealing (namely, the outer edge side of the circular sealing board 7 touches the lid 3 later than the tip 73), which allows the gathered resin part 6 to be selectively formed on the opening 24 side (the inner side) relative to the inner edge of the circular sealing board 7, which has touched earlier.

In the present invention, the circular sealing board 7 is so formed that a part corresponding to the part other than the open trigger 4 of the container 1 has the curved surface 72 that is rounded to have a curved cross section on the entire inner and outer edges, and a part corresponding to the open trigger 4 of the container 1 on the circular sealing board 7 has the curved surface 72 that is rounded to have the curved cross section on the inner edge and has the outer edge that touches the lid 3 later than the tip 73 of the circular sealing board 7. Using the circular sealing board 7, a container having the high sealing performance, the easy-open performance and the anti-open performance of the lid 3 from other than the open trigger 4, which are preferable performances, can be manufactured.

Note that since the sealing board 7 integrally forms the circular heat-seal part 26 as shown in FIGS. 1A and 1B, the sealing board 7 may be a circular sealing board (seal ring) in which the above-described inclined surface 71 and the curved surface 72 are formed circularly and continuously or may be a circular sealing board (seal ring) in which the above-described inclined surface 71 and the curved surface 72 are formed only at the part corresponding to the open trigger 4 of the easy-open container 1.

In order to heat-seal the flange 25 of the container body 2 and the lid 3 using the circular sealing board 7 having a shape shown in FIGS. 4 and 5, first, as shown in FIG. 4, the tip 73 corresponding to the boundary A between the inclined surface 71 and the curved surface 72 of the circular sealing board 7 touches the lid 3, and then the curved surface 72 formed on the inner edge side of the boundary A and the inclined surface 71 formed on the outer edge side of the boundary A respectively press the lid 3 toward the inner side of the lid 3 and an outer side of the lid 3. Accordingly, resin components of the surface layer 21 of the container body 2 and the subsurface layer 22 adjacent to the surface layer 21 are pressed toward the inner side of the container body 2 from a part located below the boundary A to form the swelling gathered resins 61, 62 in the vicinity of a flange 25 which the inner edge of the circular sealing board 7 touches, namely, in the vicinity X of the inner end of the seal part 26 of the container body 2, and then the seal layer 31 of the lid 3 is pressed to form the gathered resin 63. Then, with these gathered resins forming gathered resin part 6, the surface layer 21 exposed on the flange 25 of the container body 2 and the seal layer 31 of the lid 3 are heat-sealed and fused to each other.

Here, as heat-sealing condition, heat-sealing temperature may be appropriately determined depending on the types of the materials to be heat-sealed, but it may generally be around 160° C. to 240° C. Similarly, sealing pressure may be around 10 to 50 kg/cm$^2$ (100 to 50 kPa).

Incidentally, with only the heat-sealing using the circular sealing board 7, contaminants might likely enter the container from the outer end side. In order to prevent the contaminants from entering, after heat-sealing the seal layer 31 of the lid 3 to the surface layer 21 of the flange 25 while forming the above-described swelling gathered resin part 6 by the circular sealing board 7, the surface layer 21 of the container body 2 and the seal layer 31 of the lid 3 are heat-sealed by pressing another circular sealing board (circular sealing board 7a in FIG. 2) so as not to touch the gathered resin part 6 (or so as not to firmly press the gathered resin part 6) but touch the outer circumference side of the circular sealing board 7. A sealing surface of the above-described circular sealing board 7a may be flat, or may be a surface to which a knurl or the like can be partially bonded so as not to degrade the easy-open performance.

(I-4) Opening of Easy-Open Container 1

Figure 7:
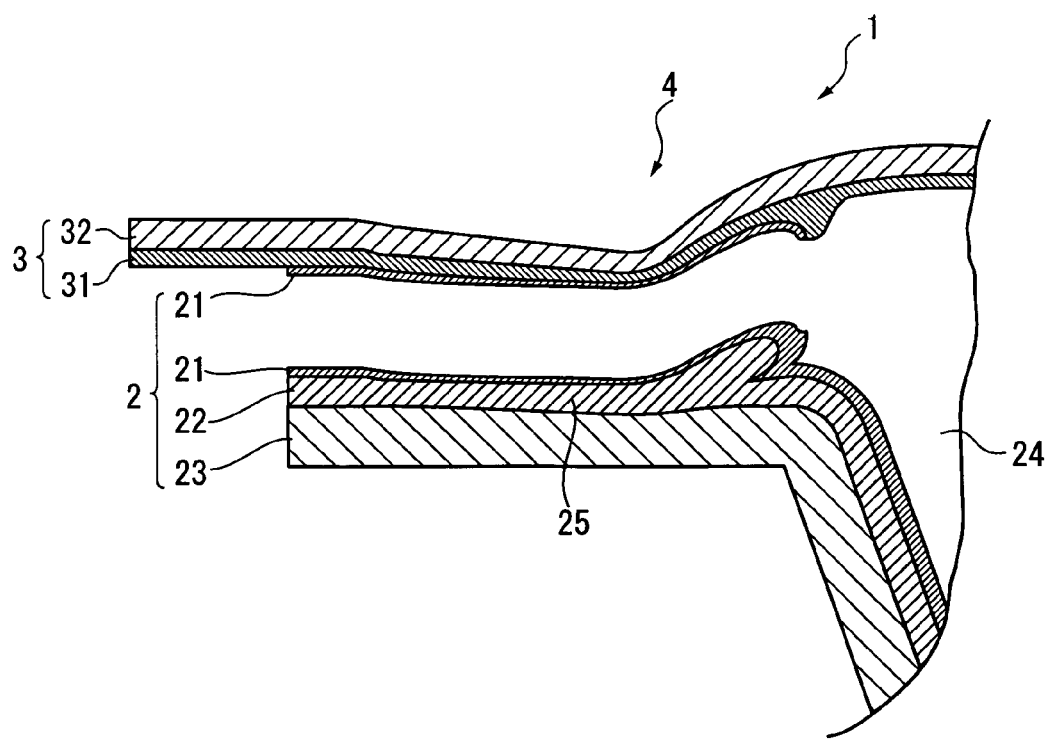
FIG. 7 is a fragmentary cross section showing a complete open state of the easy-open container according to the first embodiment.

FIG. 6 is a cross section showing an initial open state of the easy-open container 1 of the present embodiment, and FIG. 7 is a cross section showing a complete open state of the easy-open container 1.

Incidentally, the "initial open state" herein indicates a state in which a peeled surface caused by the cohesive peel does not reach the gathered resin part.

When the easy-open container 1 of the present embodiment which is obtained by heat-sealing the flange 25 of the container body 2 and the lid 3 is opened from the open trigger 4, as shown in FIG. 6, by applying a force F to the lid 3 in a direction shown by an arrow in FIG. 6, the cohesive peel in the surface layer 21 of the container body 2 progresses.

When the cohesive peel reaches the gathered resin part 6, the cohesive failure in the surface layer 21 progresses along a profile of the gathered resin 62 formed on the subsurface layer 22 adjacent to the surface layer 21.

Then, the cohesive peel in the surface layer 21 reaches the vicinity X of the inner end of the seal part (which serves also as a cutting position), the gathered resin 61 of the surface layer 21 of the container body 2 is cut in a manner following a profile of the gathered resin 63 formed on the seal layer 31 of the lid 3, thereby easily realizing opening of the lid 3 from the container body 2 of easy-open container 1.

(I-5) Advantage of Embodiment:

According to the present embodiment described above, the following advantages can be obtained.

(1) Since the easy-open container 1 including the container body 2 that has the flange 25 extending from the circumference of the opening 24 is obtained by circularly heat-sealing the flange 25 of the container body 2 and the lid 3, the container can maintain the high sealing performance while allowing the lid 3 to be opened by a cohesive failure occurring in the surface layer 21 of the container body 2, so that the container has stable initial opening strength and can be opened smoothly as compared to the mode in which the surface layer 21 of the container body 2 and the subsurface layer 22 adjacent to the surface layer 21 are peeled off from each other by an interfacial peel. Also, a problem in which the surface layer 21 at the gathered resin part 6 is stretched in opening to cause poor opening appearance of the container 1 can be prevented.

(2) Since there is formed the swelling gathered resin part 6 formed of resin components of the surface layer 21 of the container body 2, the subsurface layer 22 adjacent to the surface layer 21 and the seal layer 31 of the lid 3 in the vicinity X of the inner end of the seal part on the flange 25, the high-sealing performance can be secured.

(3) As the manufacturing method of the easy-open container 1, the circular sealing board having the curved surface 72 on the inner edge and having the inclined surface 71 on the outer edge side is pressed to the upper side of the flange 25 to heat-seal the surface layer 21 of the container body 2 and the seal layer 31 of the lid 3 are heat-sealed while forming, in the vicinity X of the inner end of the seal part on the flange 25, the swelling gathered resin part 6 formed of resin components of the surface layer 21 of the container body 2, the subsurface layer 22 adjacent to the surface layer 21 and the seal layer 31 of the lid 3, so that the easy-open container 1 having advantages (1) and (2) described above can be obtained efficiently.

(4) Since the circular sealing board 7 for forming the swelling gathered resin part 6 simultaneously with the heat-sealing employs the one having the curved surface 72 on the inner edge and having the inclined surface 71 on the outer edge side, the gathered resin part 6 can be formed selectively in the vicinity X of the inner end of the seal part 26, but not formed in the vicinity of the outer end thereof. In addition, the seal layer 31 of the lid 3 and/or the surface layer 21 of the container body 2 can be prevented from being cut off in the vicinity of the base of the gathered resin part 6 on the outer circumference side of the container in heat-sealing, thereby avoiding a problem in which the lid 3 is torn in the middle of opening to degrade the easy-open performance.

(5) Further, positioning of the circular sealing board 7 in manufacturing does not have to be very accurate, thus achieving good productivity and providing the easy-open container 1 with high quality and with low cost.

[Second Embodiment]

In the easy-open container 1 of the first embodiment described above, the container body 2 and the lid 3 are opened by the cohesive peel occurring in the surface layer 21 of the container body 2.

Figure 8:
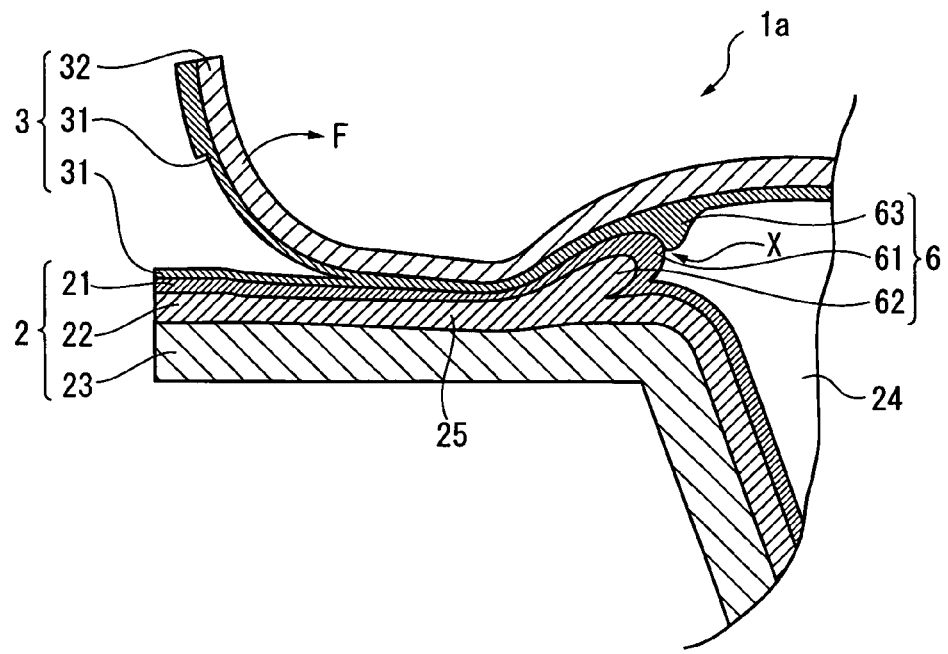
FIG. 8 is a fragmentary cross section showing an initial open state of an easy-open container according to a second embodiment.
Figure 9:
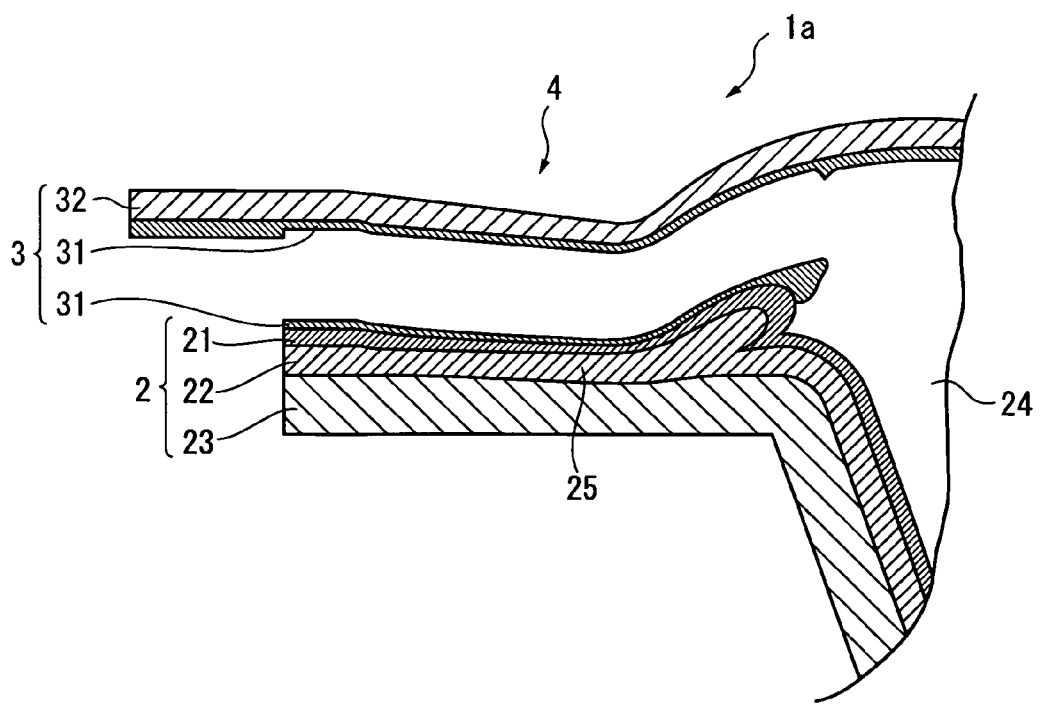
FIG. 9 is a fragmentary cross section showing a complete open state of the easy-open container according to the second embodiment.

On the other hand, an easy-open container 1a of a second embodiment is different from the first embodiment in that the cohesive peel occurs in the seal layer 31 of the lid 3 in opening the container body 2 and the lid 3 as shown in FIGS. 8 and 9.

Incidentally, in the present embodiment, the same structures and the same components as those in the first embodiment are indicated by the same reference numerals for omitting or simplifying the detailed description thereof.

FIG. 8 is a cross section showing an initial open state of the easy-open container 1a of the present embodiment, and FIG. 9 is a cross section showing a complete open state of the easy-open container 1a.

As shown in FIGS. 8 and 9, in order to generate the cohesive failure in the seal layer 31 of the lid 3 of the easy-open container 1a to cause the lid 3 to be peeled off, materials such as a styrene graft propylene resin and an adhesive polyolefin resin may be used for the seal layer 31.

For the surface layer 21 of the container body 2, the polyolefin resin such as the polypropylene resin and the polyethylene resin and the blended material of the above may be used.

Note that in a case where the lid 3 employs the seal layer 31 described above and the container body 2 employs the surface layer 21 described above, and the both are heat-sealed to each other, the both layers 21, 31 are fused to each other, while, in opening, the cohesive failure occurs in the seal layer 31 of the lid 3 which is weak against the stress, so that the opening can be performed properly.

In order to open the easy-open container 1a of the present embodiment from the open trigger 4, as shown in FIG. 8, when a force F is applied to the lid 3 in a direction shown by an arrow in FIG. 8, the cohesive peel in the seal layer 31 of the lid 3 progresses. When the opening reaches the gathered resin part 6, the cohesive peel in the seal layer 31 progresses along the profile of the gathered resin 61 formed on the surface layer 21 of the container body 2, the surface layer 21 having heat-sealed with the seal layer 31.

When the cohesive peel in the seal layer 31 of the lid 3 reaches the vicinity X of the inner end of the seal part (which serves also as a cutting position), the gathered resin 63 on the seal layer 31 is cut off, thereby easily realizing the opening of the container body 2 and the lid 3 of the easy-open container 1a.

According to the second embodiment, advantages substantially the same as the ones in the first embodiment can be attained.

[Modification of Embodiments]

The above description only shows one mode of the present invention, and the above-described embodiments do not limit the present invention but include modifications and improvement as long as the arrangements of the present invention is included and the object and the advantages can be achieved Specific structures and shapes in implementing the invention may be other ones as long as the object and the advantages of the present invention can be achieved. Incidentally, the scope of the present invention is not limited to the embodiments described above, but includes modifications and improvements as long the object of the present invention can be achieved.

For instance, in the above-described embodiments, the cohesive peel occurs in the surface layer 21 of the container body 2 in the first embodiment, while the cohesive peel occurs in the seal layer 31 of the lid 3 in the second embodiment, however, the cohesive failure may occur in both of the surface layer 21 of the container body 2 and the seal layer 31 of the lid 3 to open the container. Even when the surface layer 21 of the container body 2 and the subsurface layer 22 are formed as a single member, in a case where the seal layer 31 of the lid 3 can be heat-sealed to the single member and the cohesive failure occurs in the seal layer 31 of the lid 3 when opening the lid 3, such arrangement is included in the present invention because the above-described advantages of the present invention can be expected.

In such case, when referring to FIGS. 6 to 9, they should be viewed as if, although the surface layer 21 and the subsurface layer 22 appear to be different layers, they were a single layer, and a part of the subsurface layer 22 subjected to the cohesive failure (surface of the flange 25) was indicated as the surface layer 21 for convenience of description.

As the materials of the surface layer 21 of the container body 2 and the seal layer 31 of the lid 3, in which the cohesive peel occurs, for instance, blended materials of a polypropylene and an ethylene-methacrylic acid copolymer or an ethylene-tetracyclododecene copolymer may be used for the surface layer 21, and a saturated copolymer polyester resin may be used for the seal layer 31, in addition to the materials described in the above embodiments.

Note that when implementing the manufacturing method of the easy-open container of the present invention to manufacture the easy-open container having the arrangement shown in FIGS. 1A, 1B and 2, a gathered resin may be formed at a part corresponding to a position which the outer edge of the sealing board 7 touches in addition to the gathered resin part 6 formed at the part corresponding to the position which the inner edge of the circular sealing board 7 touches. Since the gathered resin formed at the inner end side is larger than the one formed at the outer end side, the proper easy-open performance and the high sealing performance can be maintained.

Specific structure and shape of the components in the present invention may be designed in any manner as long as the object of the present invention can be achieved.

EXAMPLE

Now, the present invention will be described in more detail with examples and comparisons, the description of which by no means limit the present invention.

Example 1

The easy-open container of the present invention having an entire shape as shown in FIGS. 1A and 1B and the open trigger with a cross section structure as shown in FIG. 2 was manufactured using materials and method described below.
(2) Manufacturing of Container Body 2

A laminated body having a thickness of 600 μm was molded by co-extrusion, the laminated body including the surface layer 21, the subsurface layer 22 and the base material layer 23.

(Arrangement of Container Body 2)

Surface layer 21: polypropylene (70 wt %)+ethylene-acrylic ester-maleic acid anhydride copolymer (30 wt %) (20 μm)

Subsurface layer 22: polypropylene (80 wt %)+polyethylene (20 wt %) (100 μm)

Base material layer 23: laminated body of polypropylene (150 μm)/adhesive resin (5 μm)/ethylene-vinyl alcohol (EVOH) (30 μm)/adhesive resin (5 μm)/polypropylene (300 μm)

Next, the container body 2 of 130 mm×150 mm×30 mm having the flange was molded from the laminated body by plug assist vacuum molding. Note that the container body 2 has the flange 25 having the width of 15 mm and extending from the opening 24, the container body 2 having a shape like a substantially rectangular tray.

A multilayered film with an arrangement below was superposed as the lid 3 on the flange 25 extending from the opening 24 of the container body 2 obtained as described above, and heat-sealed the lid 3 to the flange 25 of the container body 2 under a heat-sealing condition below and using a circular sealing board (seal ring) as shown in FIG. 5 that has the inclined surface 71 and the curved surface 72 formed on the entire circumference to manufacture the easy-open container 1 of the present invention.

Incidentally, when using the container body 2 and the lid 3 having the above arrangements, the cohesive peel in which peeling progresses by the cohesive failure occurs in the surface layer 21 of the container body 2 in opening.

(Arrangement of Lid 3)
Seal layer 31: polyethylene (60 μm)
Outer layer 32: polyethylene terephthalate (PET) (12 μm)/polyamide (nylon) (15 μm) (layered in order of PET/Ny/PE).

(Sealing Condition)
Sealing temperature: 200° C.
Sealing pressure: 200 kg/piece
Time: 2.0 seconds
Number of times of heat-sealing: 1

(Specification of Circular Sealing Board)
Sealing width: 3 mm
Inclination angle θ (inclined surface 71): 6°
Rounding (rounded surface 72): 1.0 mmR Example 2

In Example 2, the easy-open container 1 was manufactured using the same method as Example 1 except that the lid 3 was arranged as follows.

Incidentally, when using the container body 2 and the lid 3 having such arrangements, the cohesive peel in which peeling progresses by the cohesive failure occurs in the surface layer 21 of the container body 2 in opening, which is the same as in Example 1.

(Arrangement of Lid 3)
Seal layer 31: polypropylene (60 μm)
Outer layer 32: same as Example 1

Example 3

In Example 3, the easy-open container 1 of the present invention was manufactured using the same method as Example 1 except that the container body 2 and the lid 3 were arranged as follows.

Incidentally, when using the container body 2 and the lid 3 having such arrangements, the cohesive peel in which peeling progresses by the cohesive failure occurs in the seal layer 31 of the lid 3 in opening.

(Arrangement of Container Body 2)
Surface layer 21: polypropylene (80 wt %)+polyethylene (20 wt %) (50 μm)
Subsurface layer 22: polypropylene (100 μm)
Base material layer 23: laminated body of polypropylene (100 μm)/adhesive resin (5 μm)/ethylene-vinyl alcohol (EVOH) (30 μm)/adhesive resin (5 μm)/polypropylene (420 μm)

(Arrangement of Lid 3)
Seal layer 31: styrene graft propylene (60 μm)
Outer layer 32: same as Example 1

Example 4

In Example 4, the easy-open container 1 of the present invention was manufactured using the same method as Example 1 except that there was employed a seal ring, as the circular sealing board 7, having the inclined surface 71 and the curved surface 72 as shown in FIG. 5 only at the part corresponding to the open trigger 4 and having, at the other part, the rounded curved surface 72 that was rounded and similar to Example 1 on the inner and outer edges while having no inclined surface, the seal ring being used in place of the seal ring that has the inclined surface 71 and the curved surface 72 formed circularly in a continuous manner.

[Comparison 1]

In Comparison 1, an easy-open container was manufactured using the same method as Example 1 except that there was employed, as the circular sealing board, a seal ring having a cross section with a plane touching the lid being flat on the entire circumference.

Incidentally, when the heat-sealing was performed using the circular sealing board (seal ring) having the shape as described above, a swelling gathered resin part was not formed in the vicinity of the inner end of the seal part on the flange of the easy-open container.

[Comparison 2]

In Comparison 2, an easy-open container was manufactured using the same method as Example 1 except that there was employed a circular sealing board having a cross section in which a curved surface with the same shape as that of the inner edge of the circular sealing board used in Example 1 (FIG. 5) is formed on the outer edge side and an inclined surface with the same shape as that of the outer edge of the circular sealing board used in Example 1 is formed on the inner edge side.

Incidentally, when the heat-sealing was performed using the circular sealing board (seal ring) having the shape as described above, a gathered resin part was not formed in the vicinity of the inner end of the seal part of the easy-open container, while a gathered resin part was formed in the vicinity of the outer end of the seal part on the flange.

[Comparison 3]

In Comparison 3, an easy-open container was manufactured using the same method as Example 1 except that a container body was arranged as follows.

Incidentally, the easy-open container with a flange of the container body having such arrangement and a lid being heat-sealed was opened by the interfacial peel in which peeling occurred in an interface between a surface layer and the subsurface layer of the container body.

(Arrangement of Container Body)
Surface layer: polyethylene (70 μm)
Subsurface Layer: polypropylene (80 wt %)+polyethylene (20 wt %) (100 μm)
Base material layer: laminated body of polypropylene (150 μm)/adhesive resin (5 μm)/ethylene-vinyl alcohol (EVOH) (30 μm)/adhesive resin (5 μm)/polypropylene (300 μm)

[Test Example 1]

An opening strength, a sealing strength, an inner pressure strength and an opening appearance of each of the easy-open containers obtained as described above in Examples 1 to 4 and Comparisons 1 to 3 were compared and evaluated with criteria as follows. The results are shown in Table 1.

(Opening Strength)

Figure 10A:
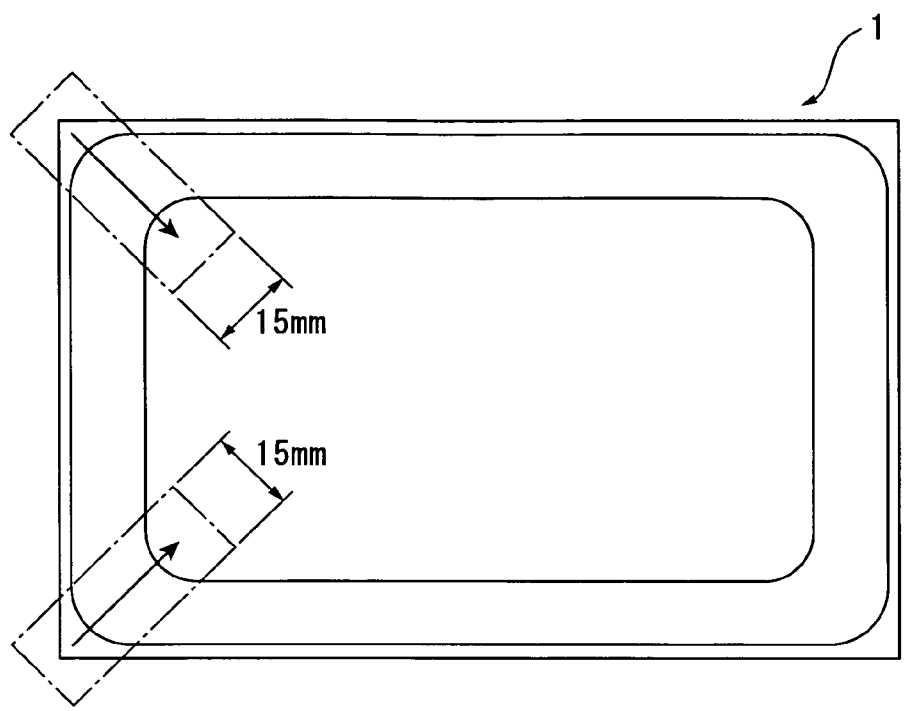
FIGS. 10A and 10B are schematic diagrams each showing a measuring position of an opening strength and a sealing strength that are measured in Test Example 1.

As shown in FIG. 10A, a corner (open trigger) of the container 1 was cut into a piece with 15 mm wide to obtain a test sample, and the test sample was measured from the outer side of the flange (an outer circumferential end side of the flange) toward the inner side (a side on the opening of the container body) (in a direction shown by an arrow in FIG.

10A) by an autograph tension tester, where a measuring condition was 300 mm/min at 135° peeling. The test was performed for n=6.

For Example 4, a sample was also taken from an arbitrary part other than the open trigger (non-opening part), which was measured in a manner same as described above.

(Seal Strength)

Figure 10B:
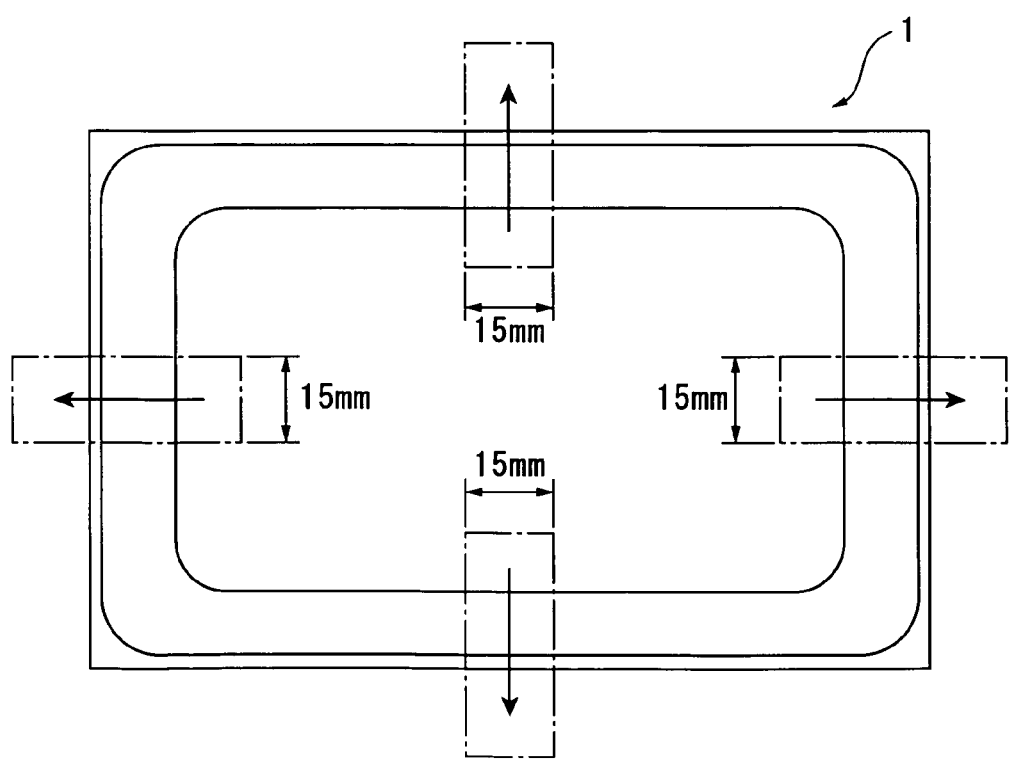

As shown in FIG. 10B, four sides of the container 1 were cut into pieces with 15 mm wide to obtain test samples, and the test samples were measured from the inner side of the flange toward the outer side (in a direction shown by arrows in FIG. 10B) by an autograph tension tester, where a measuring condition was 300 mm/min at 180° peeling. The test was performed for n=12.

(Internal Pressure Strength)

Pressurized air was introduced into the easy-open containers at 1.0±0.2 litter/min, and pressure (MPa) of the time when the containers were exploded was measured. The test was performed for n=5.

(Opening Appearance)

Appearance of the open triggers after opening was evaluated by visual observation. The evaluation results were expressed by three grades: "good" when the appearance of the open trigger was entirely good; "partly poor" when the appearance of a part of the open trigger was poor; and "poor" when the appearance of the open trigger was entirely poor.

(Result)

TABLE 1

Units for opening strength and sealing strength: kg/15 mm width

|  | Opening strength | Sealing strength | Internal pressure strength (MPa) | (Min. value) | Opening appearance | Formation of gathered resin part |
|---|---|---|---|---|---|---|
| Example1 | 0.51 | 3.19 | 0.024 | 0.020 | good | Near inner end of seal part |
| Example2 | 1.17 | 3.11 | 0.028 | 0.020 | partly poor | Near inner end of seal part |
| Example3 | 0.48 | 2.98 | 0.021 | 0.018 | good | Near inner end of seal part |
| Example4 | 0.51/3.14 (Note 1) | 3.19 | 0.024 | 0.020 | good | (Note 2) |
| Comparison1 | 0.32 | 0.60 | 0.010 | 0.013 | good | Not formed |
| Comparison2 | 1.38 | 2.28 | 0.017 | 0.016 | partly poor | Near outer end of seal part |
| Comparison3 | 4.42 | 5.72 | 0.068 | 0.030 | poor | Near inner end of seal part |

(Note 1) Open trigger/a part other than open trigger
(Note 2) Formed near the inner end of the seal part only at the open trigger or formed near the inner and outer ends of the seal part at a part other than the open trigger As shown in Table 1, the easy-open containers in Examples 1 to 3 each had a proper opening strength, an excellent easy-open performance, a large sealing strength from the inner side of the flange toward the outer side (in the direction shown by the arrows in FIG. 10B), a high internal pressure strength and a high sealing performance.

Thus, the easy-open containers in Examples 1 to 3 were each verified to be a container having both the easy-open performance and the high sealing performance. In addition, the opening appearance of the easy-open containers in Examples 1 to 3 was generally good.

On the other hand, the easy-open container in Comparison 1, in which the swelling gathered resin was not formed in the vicinity of the inner end of the seal part, had a significantly small sealing strength, a small internal pressure strength and did not have a high sealing performance.

The easy-open container in Comparison 2, in which the swelling gathered resin was formed in the vicinity of the outer end of the seal part, had a small sealing strength, a small internal pressure strength and did not have a proper sealing performance. Further, the easy-open container in Comparison 2 did not have a proper opening appearance.

In Comparison 3, in which the easy-open container was opened by the interfacial peel where the peeling occurred in the interface between the surface layer of the container body and the subsurface layer, the container had a large opening strength and an improper easy-open performance as well as a poor opening appearance.

Therefore, the easy-open containers obtained in Comparisons did not have both the easy-open performance and the high sealing performance, which were inferior to the easy-open containers obtained from Examples of the present invention with both the easy-open performance and the high-sealing performance.

The priority application Number JP 2005-022444 upon which this patent application is based is hereby incorporated by reference.

What is claimed is:

1. A manufacturing method of an easy-open container including a container body having an opening and a flange extending from a circumference of the opening; and a lid for covering the opening, in which a surface layer of the container body exposed on the flange and a seal layer of the lid are heat-sealed to form the easy-open container and the lid can be opened by a cohesive failure occurring in the surface layer of the container body and/or the seal layer of the lid, the method comprising:

superposing the lid on an upper side of the flange of the container body;

pressing a circular sealing board onto the upper side of the flange from above the lid, the sealing board including a curved surface with a curved cross section provided on an inner circumferential edge of the sealing board; an inclined surface provided on an outer circumferential edge to be continuous with the curved surface; and a tip at which the curved surface and the inclined surface meet, the tip being provided close to the inner circumferential edge in a width direction of the cross section of the circular sealing board, the sealing board being pressed to the upper side of the flange so that the curved surface touches the lid later than the tip; and heat-sealing the surface layer exposed on the flange of the container body and the seal layer of the lid while forming a swelling gathered resin part formed of respective resin components of the surface layer of the container body, a layer adjacent to the surface layer and the seal layer of the lid, the gathered resin part being formed in a vicinity of a position on the flange which the inner edge of the circular sealing board touches, wherein a radius of the cross section of the curved surface is not less than 0.2 mm and not more than 0.5×H mm, where H is a width of the circular sealing board, an angle of the inclined surface relative to the flange from the inner circumferential edge to the outer circumferential edge is in a range from 2° to 20°, and the surface layer of the container body and the seal layer of the lid are continuously heat-sealed from the outer circumferential edge toward the inner circumferential edge of the flange.

2. A manufacturing method of an easy-open container including a container body having an opening and a flange extending from a circumference of the opening; and a lid for covering the opening, in which a surface layer of the container body exposed on the flange and a seal layer of the lid are heat-sealed to form the easy-open container and the lid can be opened by a cohesive failure occurring in the surface layer of the container body and/or the seal layer of the lid, the method comprising:

superposing the lid on an upper side of the flange of the container body;

pressing a first circular sealing board onto the upper side of the flange from above the lid, the sealing board including a curved surface with a curved cross section provided on an inner circumferential edge of the sealing board; an inclined surface provided on an outer circumferential edge to be continuous with the curved surface; and a tip at which the curved surface and the inclined surface meet, the tip being provided close to the inner circumferential edge in a width direction of the cross section of the circular sealing board, the sealing board being pressed to the upper side of the flange so that the curved surface touches the lid later than the tip;

heat-sealing the surface layer exposed on the flange of the container body and the seal layer of the lid while forming a swelling gathered resin part formed of respective resin components of the surface layer of the container body, a layer adjacent to the surface layer and the seal layer of the lid, the gathered resin part being formed in a vicinity of a position on the flange which the inner edge of the circular sealing board touches; and pressing a second circular sealing board onto an outer circumferential side of the gathered resin part so as not to allow the second circular sealing board to touch the gathered resin part to heat-seal the surface layer of the container body and the seal layer of the lid, wherein a radius of the cross section of the curved surface is not less than 0.2 mm and not more than 0.5×H mm, where H is a width of the first circular sealing board, and an angle of the inclined surface relative to the flange from the inner circumferential edge to the outer circumferential edge is in a range from 2° to 20°, and the surface layer of the container body and the seal layer of the lid are continuously heat-sealed from the outer circumferential edge toward the inner circumferential edge of the flange.

\* \* \* \* \*